United States Patent [19]

Schultz

[11] Patent Number: 4,543,944
[45] Date of Patent: Oct. 1, 1985

[54] FURTHER-IMPROVED CONTROL SYSTEM FOR SOLAR HEATING SYSTEMS

[76] Inventor: Robert T. Schultz, P.O. Box 633, Wrightwood, Calif. 92397

[21] Appl. No.: 632,044

[22] Filed: Jul. 18, 1984

[51] Int. Cl.⁴ .................................................. F24J 3/02
[52] U.S. Cl. ...................................... 126/419; 126/422
[58] Field of Search ............... 126/419, 422, 437, 429, 126/430; 165/485, 18

[56] References Cited

U.S. PATENT DOCUMENTS

| | | | |
|---|---|---|---|
| 4,019,495 | 4/1977 | Frazier et al. | 126/422 |
| 4,060,195 | 11/1977 | Rapp, Jr. et al. | 126/422 |
| 4,125,107 | 11/1978 | Nurnberg | 126/422 |
| 4,319,561 | 3/1982 | Pei | 126/422 |
| 4,397,301 | 8/1983 | Onno | 126/422 |

Primary Examiner—James C. Yeung
Attorney, Agent, or Firm—Bruce L. Birchard

[57] ABSTRACT

A control circuit for controlling the fan or circulating pump in a solar-thermal heating system to prevent unnecessary pump or fan switching when short-term interruptions occur in the insolation of the solar panels includes a temperature-sensitive time-delay element tailored to have thermal response characteristics corresponding to those of the solar panels in the system.

3 Claims, 3 Drawing Figures

FURTHER-IMPROVED CONTROL SYSTEM FOR SOLAR HEATING SYSTEMS

RELATED CO-PENDING APPLICATION

This application covers an improvement in the apparatus described and claimed in my co-pending application Ser. No. 507,337 filed June 24, 1983 and entitled IMPROVED CONTROL SYSTEM FOR SOLAR HEATERS, now abandoned.

BACKGROUND OF THE INVENTION

1. Field of the Invention

This invention relates to solar heating systems and, more particularly, to control systems for optimizing the operation of such systems.

2. Prior Art

In solar water heating systems having open or closed-loop water pump control, it is quite conventional to utilize a photo responsive transistor or diode to sense the existence of insolation, or lack thereof, in order to control the pump moving water, or other heat transferring fluid, through the solar panels upon which the sun's rays are falling. In such a control system, every time a cloud passes across the path of light from the sun to the solar panel, the pump is shut off and is re-started when the cloud has passed. Every time the pump is turned on and off it, of course, produces current surges in the power line with the result that the operation of other appliances connected to the same power line is disturbed. Further the current-surges through the pump motor reduce its life. Electromagnetic noise from such on-off operation can interfere with television and radio reception and with other communications operations.

Therefore, it is an object of this invention to eliminate the various problems which have been set forth hereinbefore.

It is a further object of this invention to provide, in a solar heating system, a pump control circuit which produces minimum on-off switching of the pump motor to assure reduced interference from and longer life for the solar heating system.

SUMMARY OF THE INVENTION

By providing between the sun-sensor module and the switching module of a solar heating system, a time delay circuit which introduces a time delay approximating the thermal inertia of the solar panels involved in the solar heating system, the pump circulating the solar-heated heat-transfer fluid will remain "on" despite short-term interruptions in the flow of solar energy to the solar panels. The time delay which is introduced is determined from the thermal inertia of the solar panels in the heating system. That is, it is known from tests what time is required for significant cooling of the solar panel and the fluid within the panel at any instant. The circulating pump is not turned off until the absence of insolation has existed for approximately the cooling time of the solar panels and their contents. Thus needless switching of the pumping motor is avoided.

BRIEF DESCRIPTION OF THE DRAWINGS

My invention can be understood best by referring to the description which follows and taking that description in connection with the drawings herein, in which.

DETAILED DESCRIPTION OF THE PREFERRED EMBODIMENT

Figure 1:
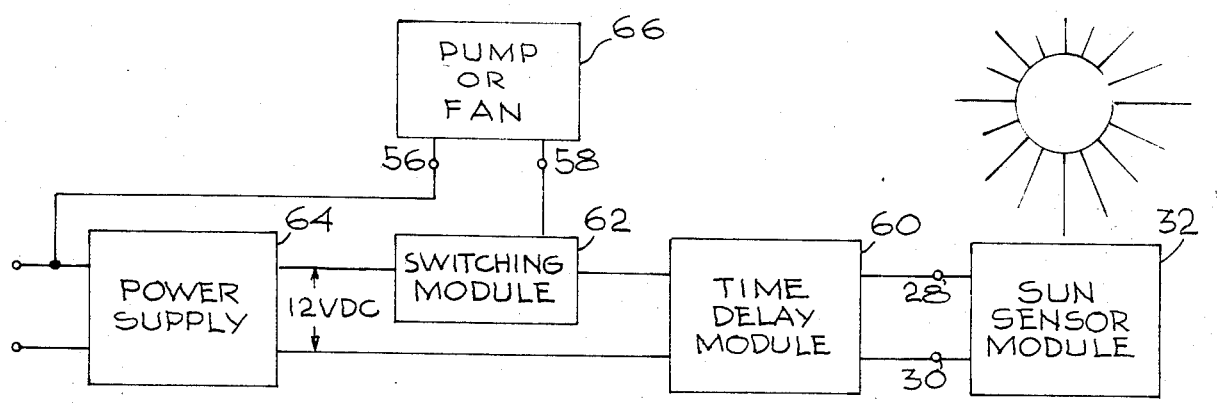
FIG. 1 is a block diagram of a solar energy heating system incorporating the present invention.

In FIG. 1, sun-sensor module 32 includes a photodiode or photo transistor which, in the presence of solar energy, effectively places a low impedance between the terminals 28 and 30. In the absence of insolation, the impedance condition between terminals 28 and 30 is very high. With the low impedance condition between terminals 28 and 30, output current from power supply 64 is applied to switching module 62 through time-delay circuit 60. The time-delay circuit 60 prevents the instantaneous application of operating current to switching module 62, or the removal instantaneously, of operating current from switching module 62. The duration of the time-delay in time-delay circuit 60 approximates the thermal inertia of lag of the solar panels being insolated by the sun. The delay which is achieved may approximate five minutes, for example. Such time-delay may be done mechanically or electrically. An electrical method for effecting the time-delay is shown in FIG. 2.

Switching module 62, following the appropriate time-delay by time-delay circuit 60, applies or removes operating power from pump or fan 66 through terminals 56, 58. Further details of power supply 64, switching module 62, time delay circuit 60 and sun-sensor module 32, at least as respects a particular embodiment of those modules and elements, will be described in connection with the circuit of FIG. 2. By reason of the introduction of the time-delay circuit 60, short term interruptions of insolation of solar panels, which interruptions may occur as a result of clouds momentarily passing between the sun and the solar panels, will not produce interruptions of current to pump or fan 66 and the current surges in the power lines which would normally occur as a result of the transient on-off phenomenon will be avoided. The life of the motor for the pump or fan will thus be extended. Other appliances on the same power line will not be adversely affected as they would be with the instantaneous switching systems of prior art solar water heating systems.

Figure 2:
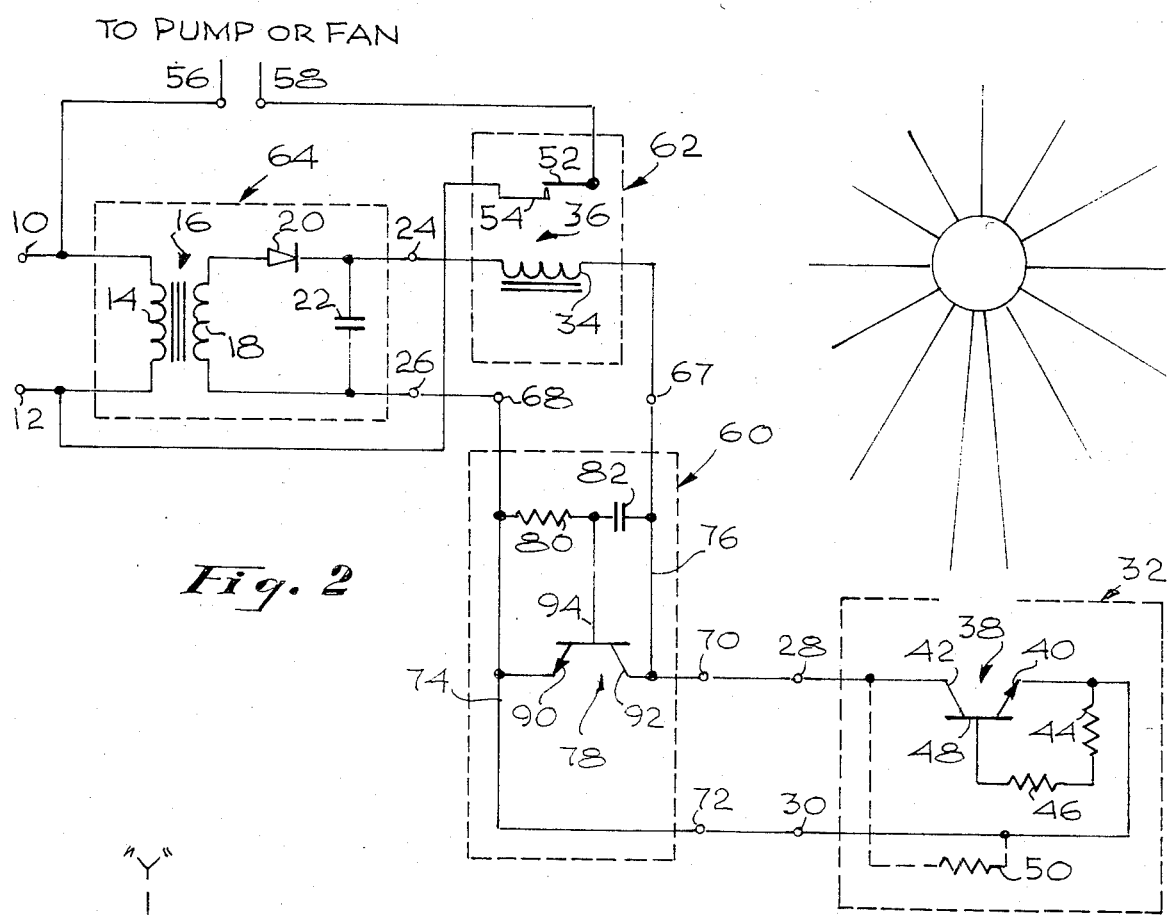
FIG. 2 is a circuit diagram of one embodiment of my invention.

In FIG. 2, alternating current at, say 110 volts and 60 $H_z$ is applied to terminals 10, 12 of primary 14 in transformer 16. The reduced voltage which appears across secondary 18 of transformer 16 is rectified by diode 20 and with the help of filter capacitor 22. A d.c. voltage is applied across terminals 24, 26. That d.c. voltage is applied to terminals 28, 30 of sensor module 32 by way of solenoid 34 in switching module 62, and terminals 67, 68 and 70, 72 of time-delay module 60. Phototransistor 38 in sensor module 32 has its emitter 40 connected to one d.c. source terminal 26 through sensor module terminal 30 and time-delay module terminals 68 and 72; and its collector 42 connected to the other terminal 28 of module 32 and thence, through terminals 70, 66 and thru solenoid 34 to the other d.c. source terminal 24. A pair of biasing resistors 44 and 46 (the purpose of which will be described henceforth) is connected between emitter 40 and base 48 of phototransistor 38. Phototransistor 38 may be a Fairchild FPT 120, or its equivalent, for example.

Time-delay module 60 includes transistor 78, which may be type 2N3904, available from Motorola and others, has its emitter 90 connected to d.c. power line 74 and its collector 92 connected to the opposite-polarity d.c. power line 76. A resistor 80 in series connected with a capacitor 82 between the same d.c. power lines 76, 76. The junction between resistor 80 and capacitor 82 is connected to the base 94 of transistor 78. Transistor 78 acts as a time constant (or capacitance) amplifier. The magnitude of resistor 80 may be 12,000 ohms, purely by way of example. Capacitor 82 may have a capacitance of 2200 mfd., for example. A time-delay of approximately five minutes is thus obtainable. The sizes of resistor 80 and capacitor 82 may be tailored to the thermal inertia of a particular solar panel assembly so that pump or fan 66 (FIG. 1) will not be shut off until the temperature of the associated solar panel assembly has fallen to a point where further pumping of heat-transferring fluid would be deleterious to the denied heating to which the solar system has been applied.

Figure 3:
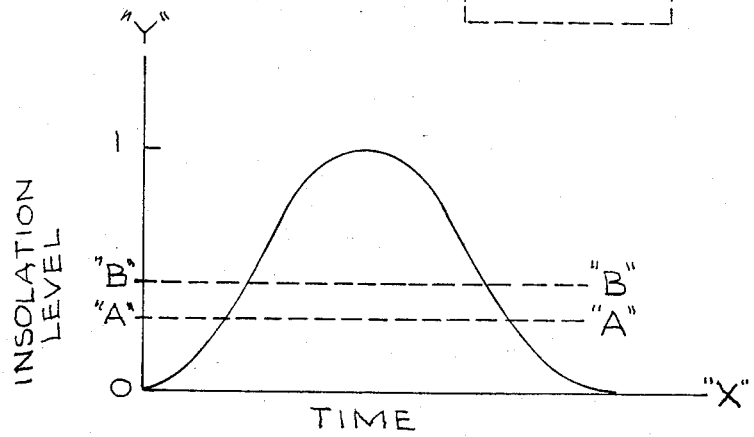
FIG. 3 is a graphical representation of a phenomenon related to the operation of the circuit of FIG. 2.

The purpose of resistors 44, 46 in FIG. 2 can be better understood after reviewing the phenomena presented in FIG. 3.

In FIG. 3, curve 8 represents the normal diurnal variation in insolation for a clear day. For a given solar energy collection system operating in a first ambient temperature the solar-fluid pump switch-on level is represented by the line "A" which intercepts the "Y" axis at the first insolation level "A". Between levels "O" "A" are the inherent losses of the collection system, e.g., glazing transmission losses, re-radiation losses, conductive losses and the like which prevent the collection system from making a positive contribution to stored thermal energy in the system. In the event of a reduction in ambient temperature the insolation level must rise to the level "B" before the collection system can make a positive contribution to stored thermal energy. Thus, the pumping or fan means is kept "off" until the insolation level "B" is reached. Thus the turn-on level is automatically varied from level "A" to level "B" as an inverse function of ambient temperature. Resistor 44 is of the silicon variety having a predetermined and positive temperature co-efficient of 0.7% per degree centigrade. Such a device is available from Texas Instruments Corporation and is called, by them, a "Sensistor". The available resistance range of such devices is, typically, from 4,000 to 20,000 ohms. The resistance versus temperature curve is somewhat tailored by the series connection of relatively temperature-insensitive resistor 46. The tailoring and choice of resistors 44 and 46 is made so that the overall temperature response of sensor module 32 corresponds to that of the companion solar energy collection system, both as to initial operating or "turn-on" point ("Y"-intercept level) and as to slope of temperature response curve after pump or fan operation commences. When phototransistor 38 turns on and after a time determined by time-delay module 60, current flows through solenoid 34 closing contacts 52, 54 of relay module 36 and applying operating a.c. voltage across terminals 56, 58 for application to a heat-transfer pump or fan, not shown. With a resistor 44 having a resistance-temperature characteristic of +0.7% per degree centigrade and the proper choice of fixed resistor 46, the desired "Y"-intercept and slope of any collector from an evacuated tube to a single-glazed flate-plate collector can be achieved.

Wind-cooling losses can be compensated for in this system by intentionally dissipating in sensor module 32 a fixed amount of power, e.g. one-fourth watt, as by means of auxiliary resistor 50. As the wind velocity in the collecting and sensing area increases, the heat generated by resistor 50 will be proportionately removed and the control of my invention will compensate for wind losses in a way analogous to that in which it compensates for changes in the ambient temperature. In actual installations this feature has been found useful in connection with unglazed collection panels.

When phototransistor 38 "sees" no sun its impedance becomes high. The current through solenoid 34 would cease and contacts 52, 54 would open, stopping the circulating pump motor or fan motor (not shown) were it not for the fact that capacitor 82 sees a voltage across it and begins to change. This changing current keeps contacts 52, 54 closed for a pre-determined period, sufficiently long to permit a cloud to pass.

The sensor module 32 of my invention is easy to install. Phototransistor 38 need only "see" the same sun as its associated collecting panels. It can be remotely located with no change in system performance. Module 32 need not be in thermal contact with the collector panels or the thermal storage means.

Thus I have provided for solar heating systems a control system that has a minimum of components for maximum reliability, which matches the thermal-response characteristics of its associated solar energy collection system, eliminates the heat energy losses produced by prior art control systems, and which is free of destructive short-term switching in periods of momentary interruption in insolation.

While a particular embodiment of my invention has been shown and described, it will be apparent to those skilled in the art that variations and modifications may be made herein without departing from the spirit or scope of my invention. It is the purpose of the appended claims to cover all such modifications and variations.

I claim:

1. For use in a solar-heating system having transferring means for transferring elsewhere solar-generated heat energy from solar-energy collecting means, control means for controlling said transferring means, said control means, including;

terminal means adapted to receive operating power for said transferring means;

a source of D.C. operating power for said control means;

a relay having a solenoid and at least one pair of normally-open contacts;

a sensor module including a phototransistor having a collector, an emitter and a base;

said sensor module also including a temperature-sensitive resistor coupled between said emitter and said base of said phototransistor;

time-delay means having first and second input terminals and first and second output terminals;

said collector being coupled, through said first input and output terminals of said delay means and said solenoid to said source of D.C. operating power;

said phototransistor being responsive to solar energy incident thereon to become conductive at a solar energy level dependent upon the magnitude of said temperature-sensitive resistor;

said relay being responsive, following a delay by said delay means, to conduction by said phototransistor to close said normally open contacts with a corresponding delay;

said normally open contacts being adapted for serial connection between at least one of said terminal means and said transferring means.

2. Apparatus according to claim 1 in which said sensor module includes a trimming resistor serially connected with said temperature-sensitive resistor between said emitter and said base of said phototransistor.

3. Apparatus according to claim 1 which includes, in addition, a wind-velocity compensating resistor mounted in said sensor module and coupled across said source of D.C. operating power.

* * * * *